Figure 12:
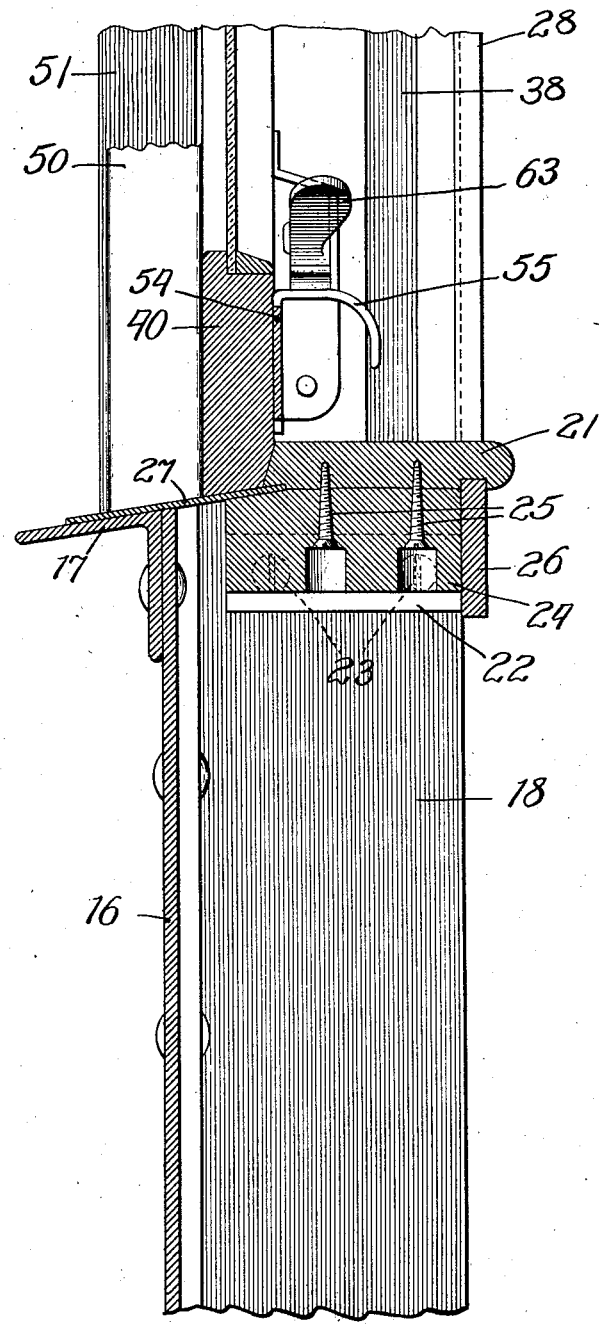

C. H. ANDERSON.
PASSENGER CAR.
APPLICATION FILED JULY 7, 1909.
946,871.
Patented Jan. 18, 1910.
6 SHEETS—SHEET 1.
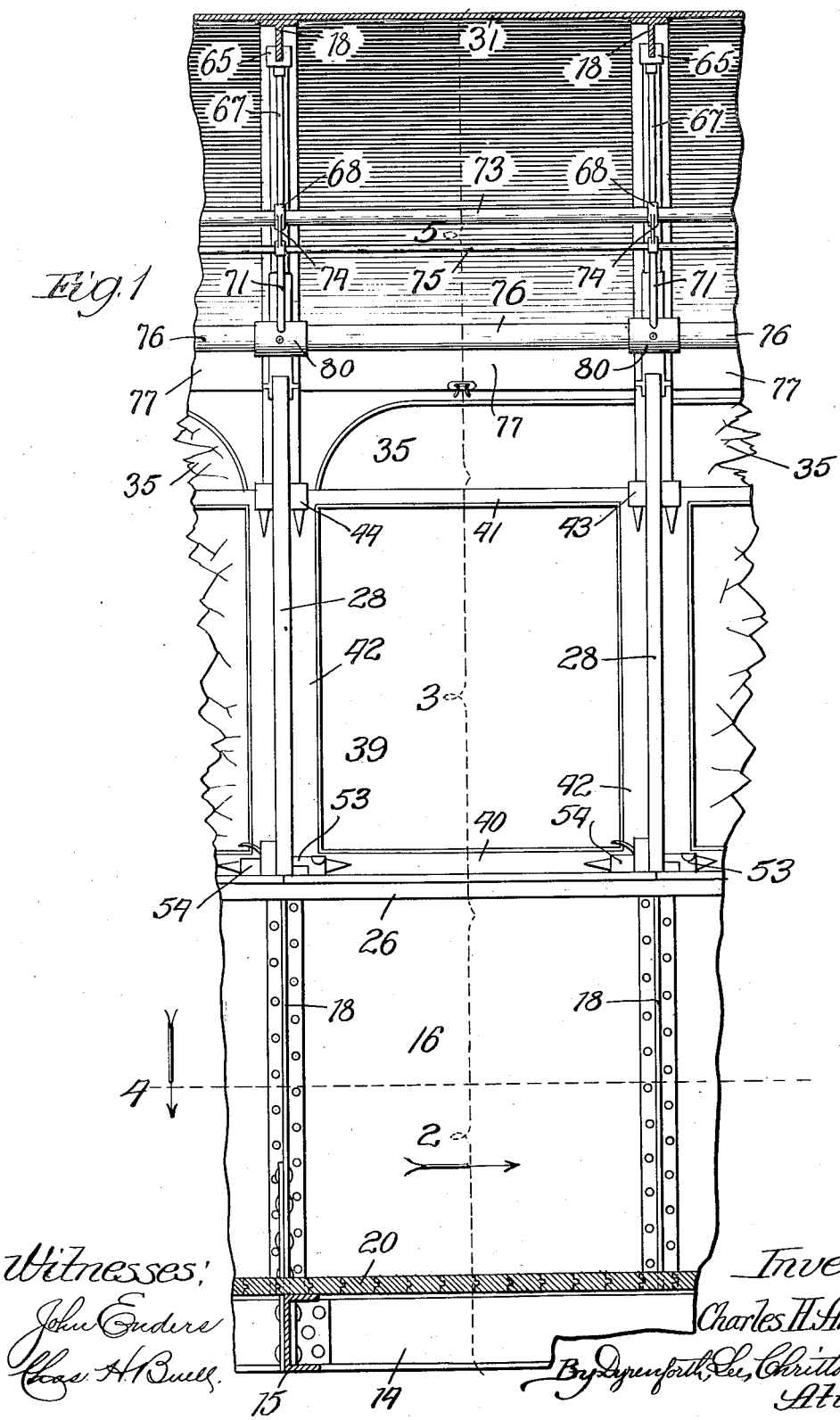

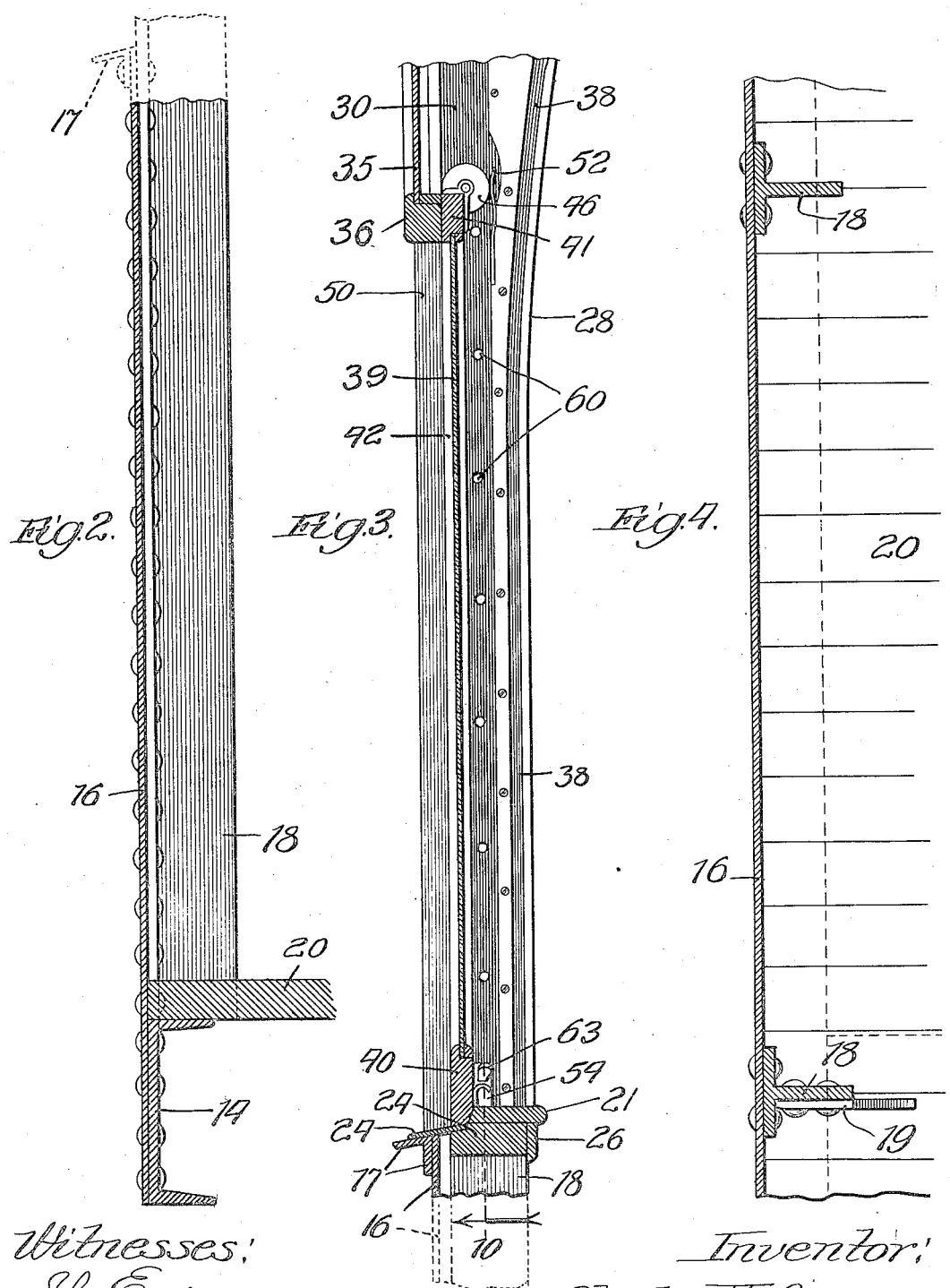

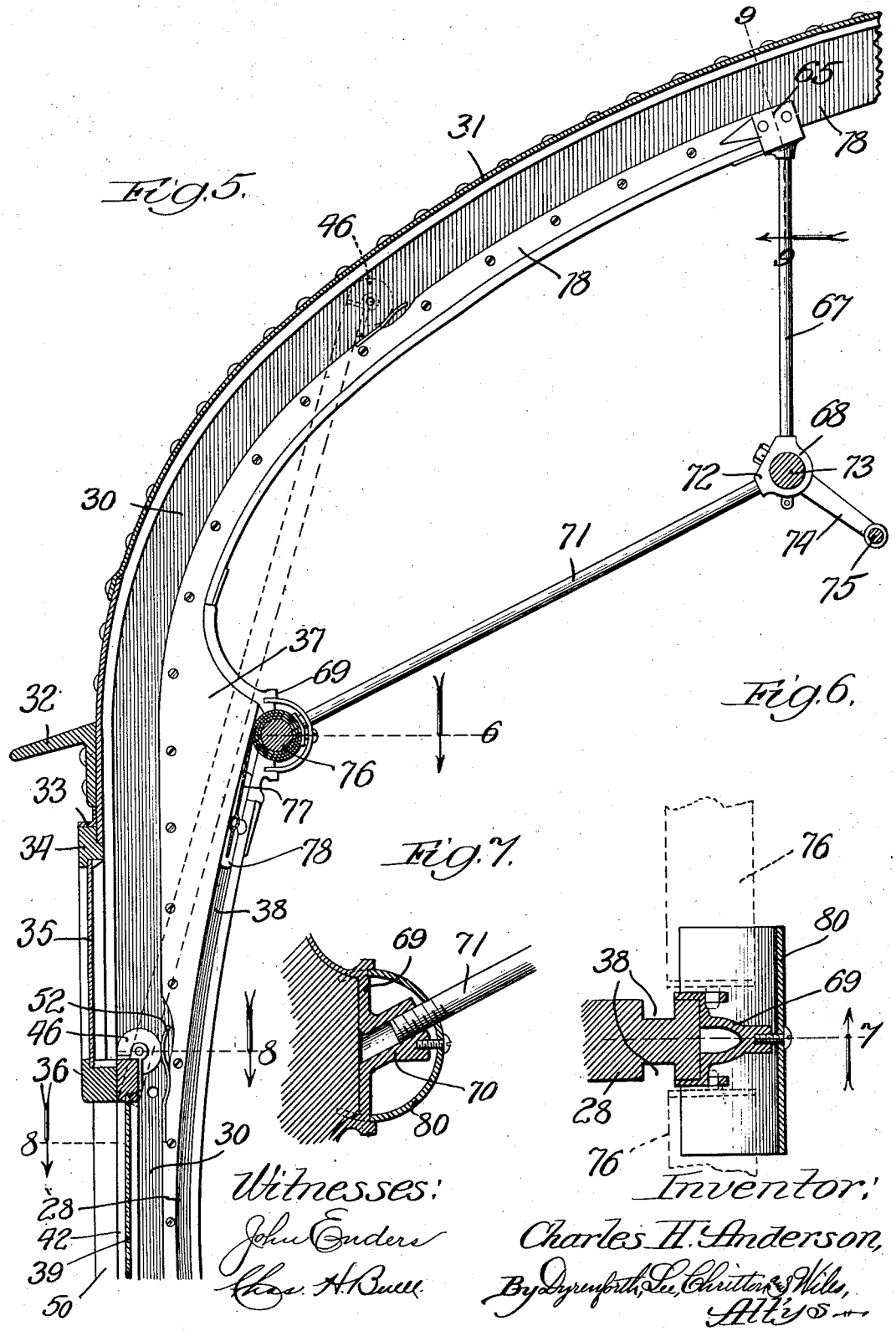

C. H. ANDERSON.
PASSENGER CAR.
APPLICATION FILED JULY 7, 1909.
946,871.
Patented Jan. 18, 1910.
6 SHEETS—SHEET 4.
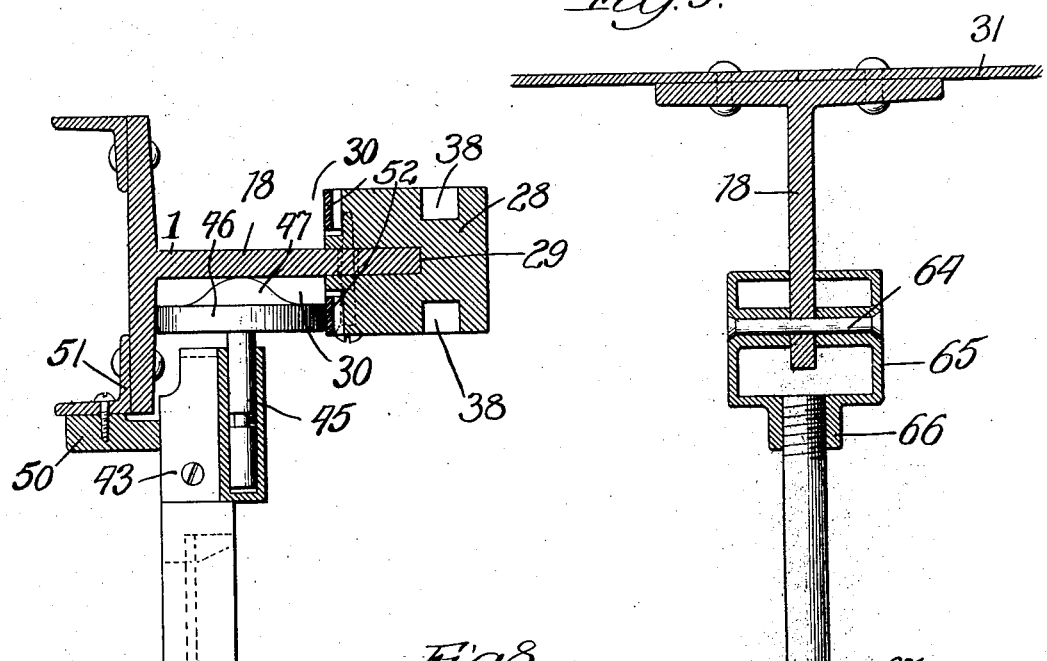
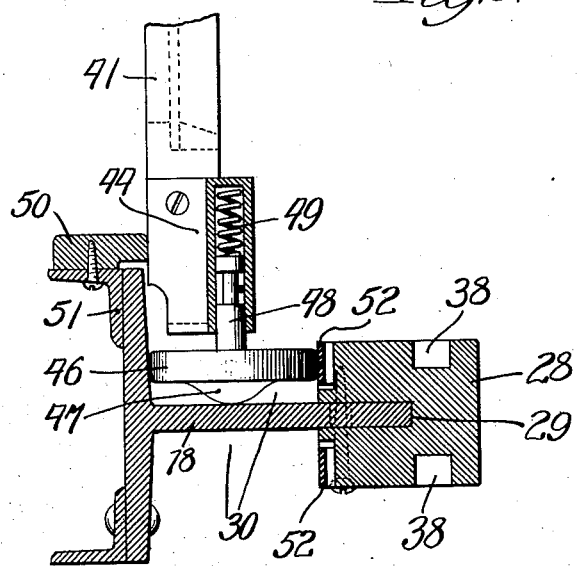
Witnesses:
John Enders
Chas. H. Buell
Inventor:
Charles H. Anderson,
By Dyrenforth, Lee, Chritton & Niles,
Attys.

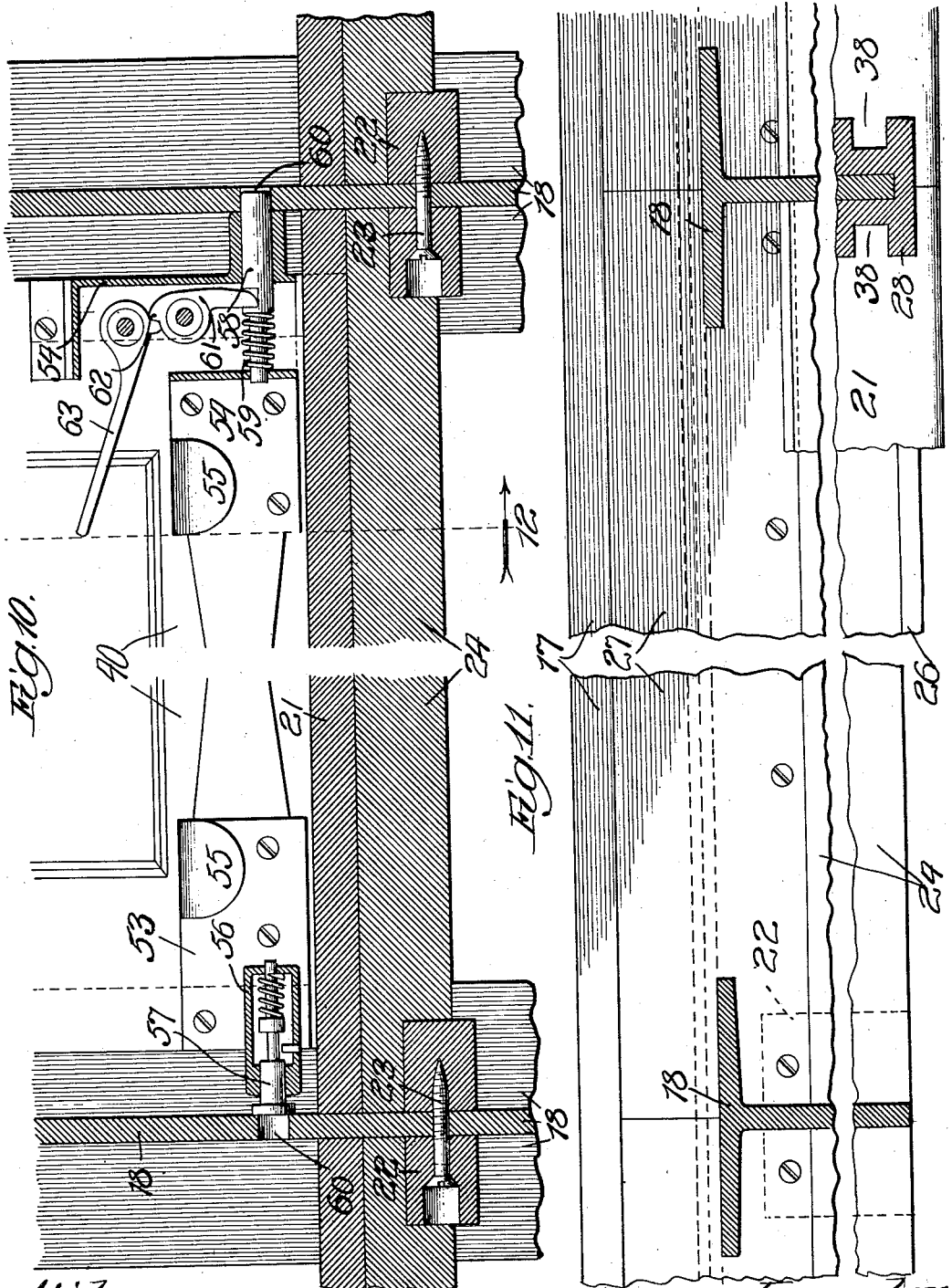

C. H. ANDERSON.
PASSENGER CAR.
APPLICATION FILED JULY 7, 1909.

946,871.

Patented Jan. 18, 1910.
6 SHEETS—SHEET 6.

Witnesses:
John Enders
Chas. H. Buell

Inventor:
Charles H. Anderson,
By Dyrenforth, Lee, Chritton & Wiles,
Attys.

UNITED STATES PATENT OFFICE.

CHARLES H. ANDERSON, OF SEATTLE, WASHINGTON.

PASSENGER-CAR.

946,871.  Specification of Letters Patent.  Patented Jan. 18, 1910.

Application filed July 7, 1909. Serial No. 506,332.

*To all whom it may concern:*

Be it known that I, CHARLES H. ANDERSON, a citizen of the United States, residing at Seattle, in the county of King and State of Washington, have invented a new and useful Improvement in Passenger-Cars, of which the following is a specification.

My invention relates to improvement in those features entering into the construction of a steel passenger-car which include, more particularly, the window fittings and inside trimming and finishing details.

In the manufacture of steel passenger-car bodies, the work of applying the window fittings and attendant parts is usually regarded as that requiring the greatest skill and involving the greatest expense.

My object is to provide certain improvements in the construction of those parts of the car body which form or include the said fittings, with a view to effecting a material saving in cost, while preserving the desired substantial and attractive appearance.

In the accompanying drawings I illustrate my improvements in one preferred form applied to the body of a steel passenger-car designed, more particularly, for interurban electric railways.

Referring to the drawings—Figure 1 is a broken, fragmentary and sectional view showing enough of the inner side of a car body, constructed with my improvements, to take in one window complete; Figs. 2, 3, 4 and 5, broken and enlarged sections taken on lines 2, 3, 4 and 5, respectively, in Fig. 1, and viewed as indicated by the arrows; Fig. 6, an enlarged broken section taken on line 6 in Fig. 5; Fig. 7, a section on line 7 in Fig. 6; Figs. 8 and 9, sections on the irregular lines 8 and 9 in Fig. 5; Fig. 10, a broken and enlarged section on line 10 in Fig. 3; Fig. 11, a broken sectional plan view of the inner and outer window-sills; and Fig. 12, a broken section on line 12 in Fig. 10.

The car-body frame, parts of which are shown in the accompanying drawings, is of an improved construction forming the subject of an application filed by me simultaneously herewith and bearing Serial No. 506,375. The under framing includes the side channel beams 14 and cross-beams 15 shown, and riveted to the beams 14 are side-plates 16 forming one of the main features of the truss construction of the car-body and extending to the height of the outer window-sills, where they are braced by a longitudinally extending angle-bar 17. The upper framing includes a series of similarly constructed arched T-bars 18 riveted to the side-plates 16. Every second T-bar is anchored to beams 14, 15 by means of gusset-plates, or the like, 19, and the under framing supports the car floor 20.

The inner window-sill 21 is of the shape in cross-section shown in Fig. 12 and fits between the webs of the T-bars 18 at opposite sides of the window. Secured to the webs are sill-supporting blocks 22, a pair being secured to each of said webs by screws 23 passing through openings in the web. Resting at their end portions upon the blocks 22 are short lengths of scantling 24 to the upper surface of which the sills 21 are secured by the screws 25. The inner face of each scantling 24 is covered by a strip 26 connected with the sill 21 by a rabbet joint. The outer sill 27 is a metal plate resting upon the angle-bar 17. Each window pilaster 28 is a single length of wood suitably ornate and provided with a longitudinally extending recess 29 in its rear face. The rear edges of the pilasters follow approximately the contour of the T-bars 18 and the pilasters fit closely at their recesses 29 over the T-bar webs to leave the channels 30 between their inner faces and the flanges of the T-bars.

At the lower edge of the roof-plates 31 is a longitudinally extending angle-bar 32 forming a water-shed, and extending beneath the same is an angle-strip 33 against the under surface of which fits the top rail 34 of the upper stationary window, or sash, 35, of which 36 is the lower rail. Each pilaster 28 is formed with an enlargement, or shoulder-portion, 37 at approximately the level of the water-shed 32, and extending therefrom to the window-sills in opposite sides of the pilaster are grooves 38. The lower window-sashes 39 are each formed with a lower rail 40, upper rail 41 and stiles 42. Secured upon the top rail 41 and against the stiles 42 are metal fittings 43, 44 formed with horizontal cylinders closed at their inner ends and open at their outer ends. Journaled in the cylinder of the fitting 43 is a shaft 45 carrying a roller 46 of a diameter to fit with reasonable closeness the adjacent channel, or runway, 30. The roller has a central enlargement 47 to bear against the web of the T-bar. Journaled in the cylinder portion of the fitting 44 is a short plunger-shaft 48 also carrying a roller 46 with a central enlargement 47. A spring 49 tends to press the wheel enlargement 47 yieldingly against the adjacent T-bar web 18 to hold the sash at its upper end yieldingly against side play and binding. Each lower sash moves at the outer surfaces of its stiles against window-stops 50 secured by screws, as indicated in Fig. 8, to angle-iron strips 51 fastened against the flanges of the T-bars 18. Each sash is of a width slightly less than the distance between the pilasters, and when lowered, the lower rail forms a close joint with the inner and outer sills, as indicated. When the sash is lowered, the rollers 46 engage leaf-springs 52 in the channels 30, the springs operating to press the upper sash-rail against the lower rail 36 of the upper window, making a dust-proof joint and further contributing to the avoidance of rattling. At opposite ends of the lower sash-rail 40 are fittings 53, 54, each formed with a window-lift 55. The fitting 53 has a horizontal cylinder 56 containing a spring-plunger 57 bearing yieldingly against the adjacent surface of the T-bar 18. The fitting 54 forms a bearing for a plunger-bolt 58 held normally extended by a spring 59 and adapted to enter openings 60 in the web of the adjacent T-bar 18. Entering a socket in the bolt 58 is a swinging arm 61 presenting a shoulder 62 to a similar shoulder on a pivotally swinging latch-handle 63, downward pressure upon which turns it and the arm 61 to withdraw the bolt 58 against the resistance of the spring 59 out of the opening 60. The pressure of the spring plunger-bolt 57 coöperates with the roller 46 above it to prevent rattling of the sash, while not interfering with the raising and lowering of the latter.

It will be seen that in the window construction shown and described the retaining guide-channels 30 for the sashes are formed by the T-bars 18 and pilasters 28 alone. In other words, the webs of the T-bars form of themselves the base walls of the channels; the inner faces of the heads of the T-bars form the outer walls of the channels; and the inner edges of the pilasters at opposite sides of the T-bar webs form the inner walls of the channels, all without additional trimmings or linings for the T-bar webs. This not only economizes the construction without detracting from its appearance, but renders it possible to employ the rollers 46 and attendant features without narrowing the windows or widening the spaces between them.

Secured by pins 64 to each T-bar 18 at the upper end of the pilaster 28 is a bifurcated casting, or fitting, 65 embracing the web of the T-bar and presenting a vertical threaded socket 66. Secured at its upper end in the threaded socket 66 is a rod 67 which extends vertically downward and engages a threaded socket in a sleeve-piece 68. Fitted against the part 37 of each pilaster is a casting, or fitting, 69, having a threaded socket-portion 70 to which is secured a rod 71 extending to a threaded socket-portion 72 of the sleeve-piece 68. The sleeve-pieces 68 hold the strap-hanger rod 73 and from each projects an arm 74 having an eye in its end for the passage of a bell, or fare-register, cord 75. The rods 67, 71 brace and sustain the sleeve-pieces 68. The castings 69 also form bearings for the ends of spring curtain-rollers 76 carrying curtains 77 provided at their lower edges with strips 78 running in the pilaster grooves 38. The castings 69 carry semi-cylindrical housings 80 which serve to hide them and the ends of the curtain-rollers.

It has been one of my aims in the present construction to render all similar parts interchangeable, to facilitate placing them in position. The lower window-sashes are all of the same size and construction and when, for any reason, it is desired to remove a sash this may be done by raising it along the channels 30, past the upper ends of the pilasters 28. Usually, when a window-pane is broken or an accident happens to the window-sash, it is necessary to put the entire car out of service for the repairs. In the present construction, it is only necessary to slip out the sash, as described, and replace it with another. It has also been my desire to cause one fitting to serve more than one purpose wherever possible, as in the case of the T-bars 18, one length pilasters 28 and castings 69, all to the end of simplifying the construction and the production of a car-body as light as possible consistent with necessary strength and durability.

What I claim as new and desire to secure by Letters Patent is—

1. In a passenger-car, the combination of parallel T-bars supporting the upper-structure and separating the window-openings, and a pilaster fitting over the edge-portion of each T-bar web and forming therewith sash guide-channels at opposite sides of the web, the web and head of the T-bar forming of themselves the outer and base walls of the channels and the inner faces of the pilaster forming the inner walls of the channels, for the purpose set forth.

2. In a passenger-car, the combination of parallel arched T-bars supporting the upper-structure and separating the window-openings, a sill and a raising and lowering sash in each window-opening, and a pilaster fitting over the edge-portion of each T-bar web and extending from the window-sill to a point short of the top of the car to form, with the T-bar, guide-channels for the sashes open at their upper ends for the insertion and removal of the sashes, the webs and heads of the T-bars forming of themselves the outer and base walls of the channels and the inner faces of the pilasters forming the inner walls of the channels, for the purpose set forth.

3. In a passenger-car, the combination of parallel T-bars supporting the upper-structure and separating the window-openings, and a pilaster between each pair of windows formed of a single length of wood fastened to the T-bar and provided in its rear side with a recess which fits over the edge of the T-bar web, the inner faces of the pilasters forming the inner walls of sash guide-channels and the webs and heads of the T-bars forming of themselves the outer and base walls of the channels, the pilasters being provided in opposite sides with curtain-guide grooves, for the purpose set forth.

4. In a steel passenger-car, a series of arched T-bars spaced equidistant apart and each provided with a series of window-catch perforations, said T-bars supporting the upper structure and separating the window openings, a raising and lowering sash in each window opening, pilasters secured against the T-bars and forming therewith retaining guide-channels for the sashes, and window-locking plunger-bolts on the sashes adapted to engage said perforations.

5. In a steel passenger-car, a series of arched T-bars spaced equidistant apart, supporting the upper structure and separating the window openings, a sill and a raising and lowering sash in each window opening, pilasters extending from the window-sills short of the top of the car and secured against the T-bars to form therewith retaining guide-channels for the sashes open at their upper ends for the insertion and removal of sashes, the pilasters having curtain-guide grooves in their opposite sides extending from the sills to the tops of the window openings, castings fitting against and secured to the pilasters at the tops of said grooves and forming curtain-roller bearings, strap-hanger-rod retaining-sleeves opposite the pilasters, stay-rods extending from said castings to said sleeves, metal fittings secured to the upper ends of the pilasters, and sustaining-rods extending from said fittings to said sleeves, all constructed substantially as and for the purpose set forth.

CHARLES H. ANDERSON.

In presence of—
MORRIS B. SACKS,
R. E. BANKS.